United States Patent
Voorman et al.

(10) Patent No.: US 6,788,749 B2
(45) Date of Patent: Sep. 7, 2004

(54) ERASURE BASED INSTANTANEOUS LOOP CONTROL IN A DATA RECEIVER

(75) Inventors: Johannes Otto Voorman, Eindhoven (NL); Johannes Wilhelmus Maria Bergmans, Eindhoven (NL); Ho Wai Wong-Lam, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 607 days.

(21) Appl. No.: 09/747,112

(22) Filed: Dec. 21, 2000

(65) Prior Publication Data

US 2001/0043658 A1 Nov. 22, 2001

(30) Foreign Application Priority Data

Dec. 24, 1999 (EP) .............................................. 99204533

(51) Int. Cl.⁷ .............................. H03D 1/00; H04L 27/06
(52) U.S. Cl. ........................ 375/340; 375/232; 375/326; 375/344
(58) Field of Search ................................ 375/229–233, 375/340, 317, 324, 326, 344, 345; 360/53, 51

(56) References Cited

U.S. PATENT DOCUMENTS 5,771,127 A    6/1998  Reed et al. .................... 360/51
6,118,833 A  * 9/2000  Bergmans et al. ........... 375/366
6,134,065 A  * 10/2000 Bergmans et al. ............ 360/53
6,307,884 B1 * 10/2001 Du et al. ..................... 375/233

OTHER PUBLICATIONS

"Equalization System Including Clock Recovery Applicatoin to MAC/Packet Family Signals" Palicot et al, Proceedings of the Golbal Telecommunications Conference, IEEE, vol. 2, Dec. 1991, p. 380–384.

"A Multispeed Digital Regenerative Repeater for Digital Data Transmission" LUE, IEEE Conf. 1979, p. 14.1.1–14.1.7.

* cited by examiner

*Primary Examiner*—Phuong Phu
(74) *Attorney, Agent, or Firm*—Peter Zawilski

(57) ABSTRACT

A receiver for restoring a data signal from a data input signal, comprises a data detector and a control signal generator coupled to the data detector for controlling one or more loops in the data detector, such as an automatic gain control, an equalizer adaptation and/or a timing recovery loop. The receiver also comprises erasure means for generating an instantaneous erasure information signal in case the data input signal to be restored falls within an erasure zone, which erasure means are coupled to the control signal generator for essentially instantaneous use of the instantaneous erasure information for accurate loop control. Preferably the respective control signals are kept constant in time during periods of erasure.

2 Claims, 2 Drawing Sheets

ERASURE BASED INSTANTANEOUS LOOP CONTROL IN A DATA RECEIVER

BACKGROUND OF THE INVENTION

The present invention relates to a receiver for restoring a data signal from a data input signal, comprising a data detector and a control signal generator coupled to the data detector for controlling one or more loops in the receiver, such as an automatic gain control, an equalizer adaptation and/or a timing recovery loop.

The present invention also relates to a data detector for application in the receiver.

Such a receiver is known from U.S. Pat. No. 5,398,259 disclosing a decision feedback equalizer for canceling CW interference. In particular the equalizer is incorporated in a receiver of a QPSK (Quadrature Phase Shift Keyed) system, wherein an input signal is demodulated and converted and then fed into the interference canceller. The canceller includes a feedforward and a feedback equalizer filter, whose respective filter outputs are subtracted and fed to a threshold decision circuit. The decision circuit makes a decision in favor of a logic 1 or 0, and across the decision circuit an error detector is provided for producing an error signal for control of the feedforward and feedback equalizer filters. A correlation is detected between two tap signals of the forward filter, and is compared with a threshold. At the instant the detected correlation becomes lower than the threshold, all tap-gain control circuits are frozen, i.e. they are caused to hold their amplitude values which were attained at that instant. Determination of a correlation inevitably takes some time. During this time decision errors can have a negative impact on the control loops. This impact can be severe, and could even include misconvergence of the control loops in situations when bit errors are likely, such as in conditions of low signal-to-noise ratio.

BRIEF SUMMARY OF THE INVENTION

It is an object of the present invention to prevent this negative impact. More specifically it is an object of the present invention to provide a receiver which is capable of taking instantaneous measures without unnecessary delay at the very moment a faulty decision is taken by the detector.

Thereto the receiver according to the invention is characterized in that the receiver comprises erasure means for generating an instantaneous erasure information signal in case the data input signal to be restored falls within an erasure zone, which erasure means are coupled to the control signal generator for essentially instantaneous use of the instantaneous erasure information for loop control.
Similarly the data detector according to the invention is characterized in that it comprises erasure means for generating an instantaneous erasure information signal in case the data input signal to be restored falls within an erasure zone, which erasure means are to be coupled to the control signal generator for essentially instantaneous use of the instantaneous erasure information for loop control.

It is an advantage of the receiver according to the present invention that erasure information indicating that a relevant input decision variable lies within an erasure zone provides instantaneous information about the degree of uncertainty involved in taking the decision. This information can easily be derived and is often provided for free by the detector, without additional hardware and without the detector output signal being necessary therefor. In fact erasure information is extracted in the heart of the bit-detector and is thus inherently reliable, which results in reliable bit decisions used for more robust control of the various control loops relative to techniques based on other kinds of signals.

By means of the instantaneously available erasure information an undesired drifting of the control loops from their desired settings caused by a faulty decision can be prevented. In practice if a high degree of uncertainty is associated with a bit decision taken by the detector a final decision can be postponed until a higher degree of certainty can be reached for giving a more reliable other bit decision. Thus the final decision is more reliable and where control information is derived from this final decision the control information is more reliable as well. Advantageously the aforementioned erasure information can be used for taking binary decisions, ternary decisions, generally multilevel decisions in both amplitude and/or multiphase modulation techniques, such as 4-phase, 8-phase, 16 point QAM, 16 point CCITT V0.29, 256 point QAM, QPSK, MSK offset QPSK etcetera.

An embodiment of the receiver according to the invention is characterized in that the control signal generator is arranged such that during periods of erasure the one or more loops are controlled by respective control signals, which are mainly kept constant in time. By thus freezing these loops they do not suffer from erroneous decisions taken by the detector.

Another embodiment of the device according to the invention is characterized in that during periods of erasure an erasure zone which is usually defined by a pair of erasure detection thresholds, is brought back to a single common threshold. By returning to unbiased decisions during erasure periods a more reliable decision can be derived from the detector. Whereas after the erasure period the original erasure detection having an erasure zone can be restored. For binary signals the single common threshold can be zero.

A further embodiment of the device according to the invention is characterized in that the instantaneous erasure information signal is an erasure flag which is only set during periods of erasure, or a little longer depending on the employed loop control technique. This embodiment requires essentially no overhead in the decision taking circuit, such as the decision feedback equalizer.

A still further embodiment of the device according to the invention is characterized in that the decision circuit comprises a dual decision feedback equalizer comprising two slicers having thresholds being anti-symmetric relative to a median threshold value.

Still another embodiment of the receiver according to the invention is characterized in that the receiver comprises two error detectors connected in a parallel arrangement across the respective slicers for providing error signals $e[1,k]$ and $e[2,k]$ for multiplication by respective slicer output bit decisions $a[1,k]$ and $a[2,k]$, which may optionally be delayed. Advantageously several practical embodiments are feasible now. In fact $a[1,k]$ and/or $a[2,k]$ may be delayed whereby the delayed bit decisions can be taken from either one of the slicer outputs. If at a delayed moment $l=k-i$ an erasure occurs $a[k-i]$ will be zero and then driving one or more of the control loops with the cross product $e[k]*a[k-i]$ will not affect the control loop during the erasure period.

One further embodiment of the receiver according to the invention is characterized in that the error signals are being combined according to:

$$e[k]=0.5\{e[1,k]+e[2,k]\}.$$

In this combined error signal the constituent decision errors will be less noticeable, such that these errors will have a smaller worst case impact on the control of the control loops.

A still further embodiment of the detector according to the invention is characterized in that the erasure means comprises:

two cascaded differential circuits having respective inputs and outputs, whereby two corresponding inputs of each of the differential circuits are coupled to a data input terminal, whereas and the other inputs are coupled to an upper and a lower erasure threshold terminal respectively; and a summing device coupled to the outputs such that at the output of the summing device a ternary erasure information signal is available.

It is an advantage of this still further detector embodiment that at an early moment in the bit decision making process the probability data concerning the data input level is available for later use, such as in the control and control strategy of the control loops.

BRIEF DESCRIPTION OF THE DRAWINGS

At present the receiver and detector according to the invention will be elucidated further together with their additional advantages while reference is being made to the appended drawing, wherein similar components are being referred to by means of the same reference numerals. In the drawing.

DETAILED DESCRIPTION

Figure 1:
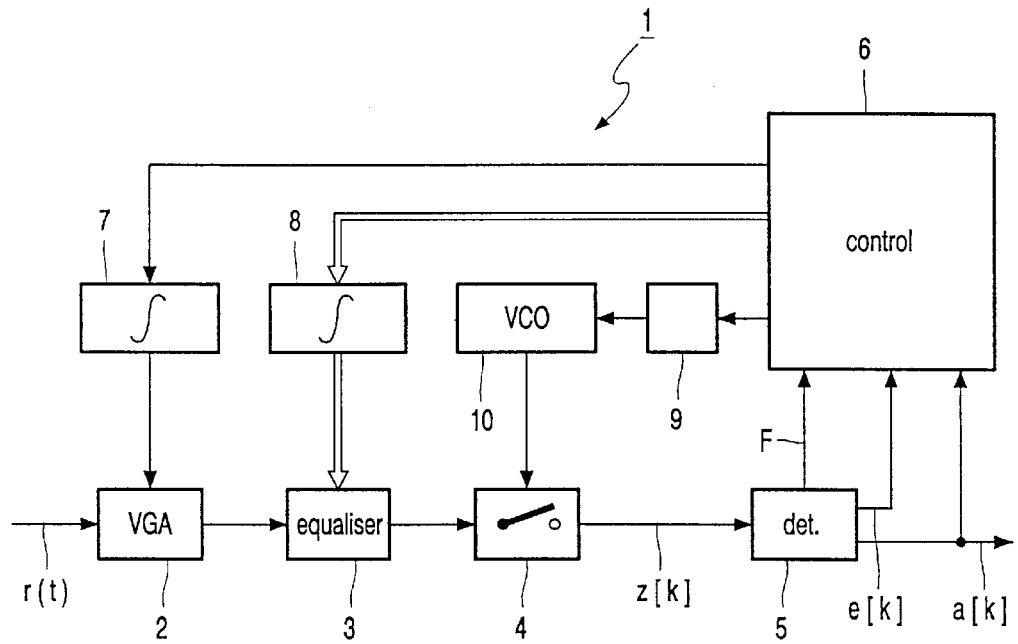
FIG. 1 shows a schematic diagram of a data receiver according to the invention.

FIG. 1 shows a diagram of a data receiver 1 capable of deriving a data output signal a[k] from an input signal r(t). The receiver 1 as shown comprises a variable gain amplifier (VGA) 2, an adjustable equalizer 3, a sampler 4, and a data detector 5 for providing the data output signal a[k]. The receiver 1 also comprises a control signal generator 6 and three control loops coupled thereto. The first loop contains a first integrator 7 for controlling the gain of the VGA 2. The second integrator bank 8 in the second loop may DC-control the equalizer 3 and adjusts its electrical characteristics in accordance with the characteristics of a channel through which the input signal r(t) came to the receiver 1. The third loop containing a loop filter 9 and a voltage controlled oscillator (VCO) 10 for controlling the sampler 4 controls the sampling operation in synchronism with the incoming data stream. The symbol detector 5 produces bit decisions a[k] and an error signal e[k] that contains a measure depending on the instantaneous difference between the actual detector input and the ideal detector input had a[k] originally been transmitted. These two signals a[k] and e[k] are used in the control signal generator 6 to derive therefrom control information that drives the gain control in the VGA 2, the equalizer adaptation in the equalizer 3 and the timing recovery by controlling the VCO 10. There are many popular adaptation and timing recovery techniques, that use the control signal generator, which is bit decision directed. Examples thereof are: zero forcing and minimum mean square error approaches. Some of the possible approaches involve additional inputs besides a[k] and e[k] and get by without either one of them. However in all cases erroneous decisions a[k], such as originating from a low signal-to-noise ratio in the input signal result in erroneous control information, which may even extend across up to several tens of symbol intervals depending on the employed control technique, as well as on the controlled loop parameter.

Additionally the data detector 5 generates an erasure signal F, which is based on erasure information extracted within the detector 5. Erasures are indicative of uncertain bit decisions and typically occur when a decision variable falls within predetermined uncertainty zones defined by two or more erasure detection thresholds. In data detectors where erasure detection is already being used for symbol detection techniques the erasure information is available for free and an erasure signal flag F can then readily be derived therefrom. For example during periods of erasure or as long as the influence of the erasure shows its negative effects on the controlling of one or more control loops the respective control signals can be maintained constant in time or can be frozen as long as effective. Because of the instantaneous availability of the erasure information an immediate action against adverse effects can be accomplished. During an erasure period the erasure zone can be crimped to zero, so that during such a period a more accurate decision can be derived from the data detector 5.

Figure 2:
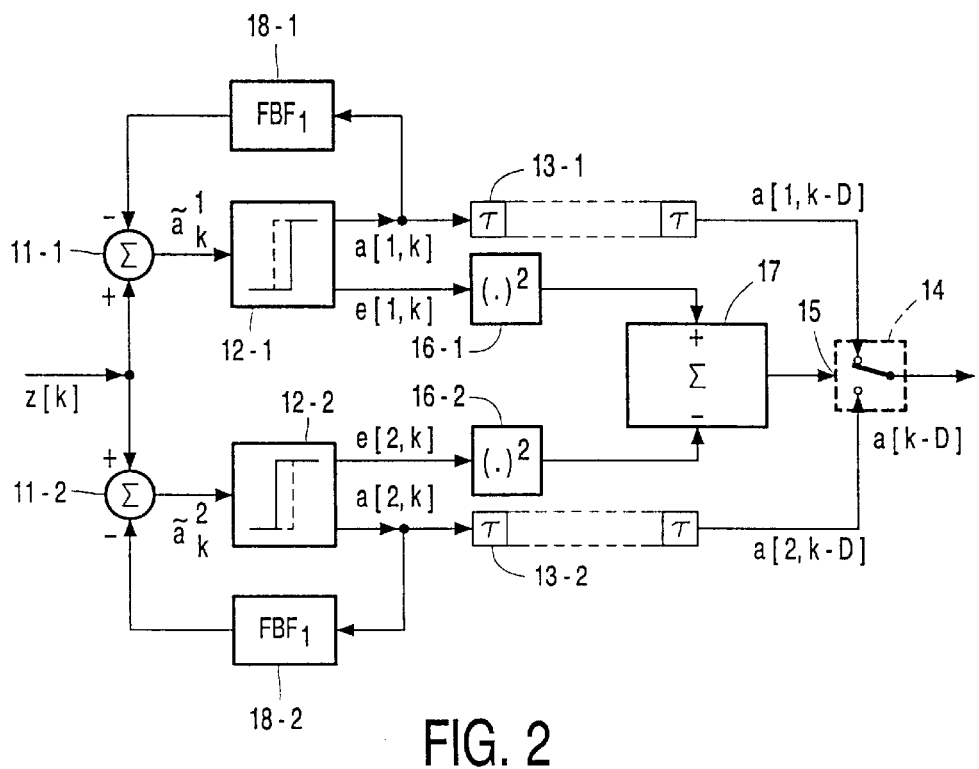
FIG. 2 shows an embodiment of a data detector for application in the receiver of FIG. 1.

FIG. 2 shows a possible embodiment of a data detector implemented as a so-called Dual Decision Feedback Equalizer (DDFE). The data detector input signal z[k] from the sampler 4 is split up in two virtually similar parts. Each detector part contains a summing circuit 11, a slicer 12, a shift register 13 having for example D stages, a controllable switch 14 having a control input 15, an error statistics circuit 16, and a history summing circuit 17 coupled to the control input 15. Output decisions of slicers 12-1 and 12-2 are fed back through feedback circuits 18-1 and 18-2 respectively to inverting inputs of the respective summing circuits 11-1 and 11-2. The necessary control logic is not explicitly shown in FIG. 2. The two slicers 12-1 and 12-2 define an erasure zone because their thresholds differ mutually by having antisymmetrical offsets $\pm\alpha$, where $\alpha$ lies for example between 0.2 and 0.3. The upper and lower DFE's run independently of each other and their decisions a[1,k] and a[2,k] are correct and identical in case of low input noise. If however the slicer input signals occasionally fall within the erasure zone $[-\alpha, \alpha]$ then the respective decisions are uncertain and moreover different. Since both decisions are applied to shift registers 13-1 and 13-2 having D stages the detector can permit itself a total of D symbol intervals to figure out which of the outputs a[1,k–D] or a[2,k–D] to settle on. The upper or lower detector part that delivers correct decisions is likely to produce small error samples e[1,k], e[2,k] during the erasure period, while the error samples of the other detector part are likely to be relatively large because the erroneous decision causes imperfect cancellation of trailing InterSymbol Interference (ISI). The history summing circuit 17 makes a comparison of the energy of both errors across the erasure period and uses it to select between the upper or the lower DFE part. The controllable switch 17 is set accordingly and both DFEs are realigned by transferring the register contents of the selected DFE to the other one. Detection thresholds then reassume their default values $\pm\alpha$, and erasure detection recommences.

Several approaches are conceivable for deriving the flag F from signals internal to the DDFE of FIG. 2:

F can be based on the logical signal that determines whether or not the DDFE is in an erasure period, so that F would be active throughout erasure periods (or slightly longer intervals) and inactive otherwise. If the duration of erasure periods is comparable to the duration that an error influences control information in a negative way, then this approach requires essentially no overhead within the DDFE;

F can be based on cross products of the form e[k]*a[k−i], where a[k−i] is a delayed bit decision that can be taken from either the upper or lower detector part. Alternatively compound bit decisions can be formed by:

$$a[k-i]=0.5*\{a[1,k-i]+a[2,k-i]\}$$

Outside erasure periods both DFE decisions coincide, so that a[k]=a[1,k−i]=a[2,k−i]. Within erasure periods decisions in both DFEs may differ, but then a[k−i]=0, so that this uncertain decision does not affect the control of the loops concerned. 3. In a similar vein, rather than taking e[k] from either the upper or the lower DFE, F can be derived from the combined error signals:

$$e[k]=0.5\{e[1,k]+e[2,k]\}.$$

Then decision errors will be less visible in this compound error signal than in either of its constituents, and will have a smaller worst case impact on the control loops.

These approaches are applicable to binary as well as multi-level data signals, and are not mutually exclusive. In particular approaches 2 and 3 can advantageously be combined to further improve the robustness of the control loops in the face of noise and other disturbances.

Figure 3:
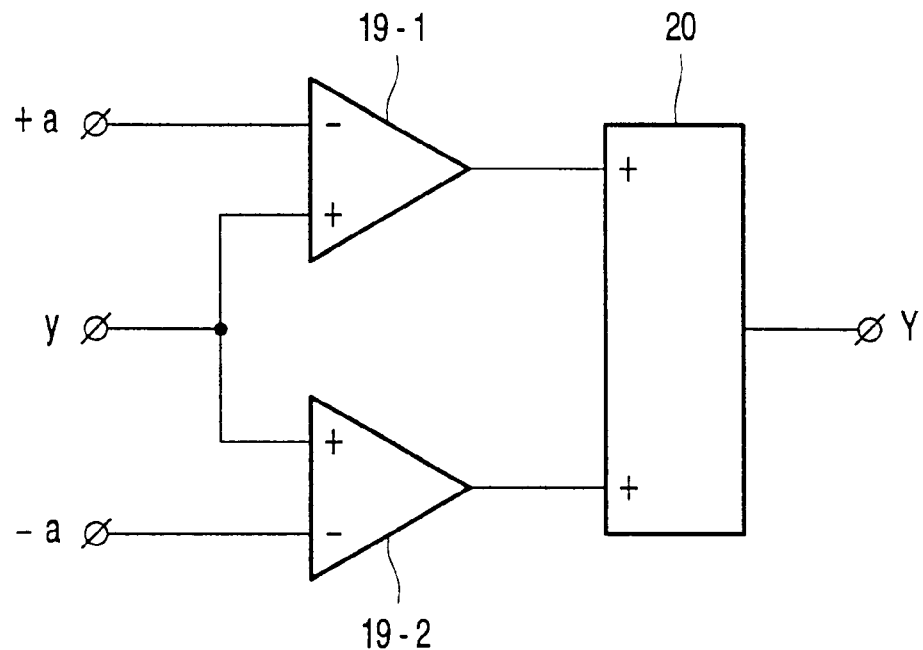
FIG. 3 shows a simple embodiment of a slicer for implementation in a data detector according to FIG. 3.
Figure 4:
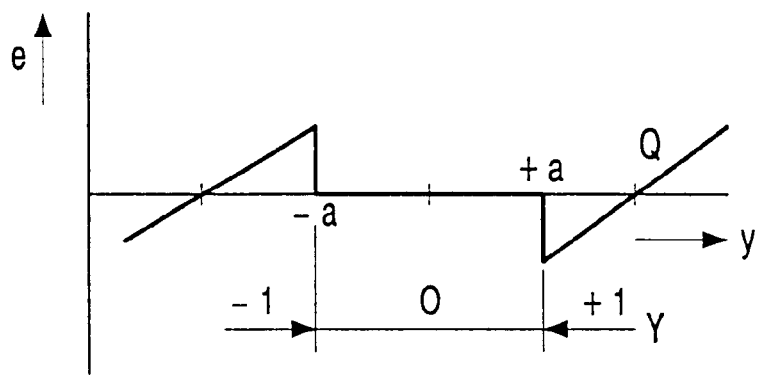
FIG. 4 shows the error versus input characteristic of the slicer of FIG. 3.

FIG. 3 shows an explicit embodiment of erasure means in the slicer 11 for implementation in a data detector of FIG. 2. Such an erasure detector comprises two cascaded differential circuits 19-1 and 19-2 having respective inputs − and + and respective outputs coupled to + inputs of a summing device 20 of the detector. Respective − inputs of the circuits 19 are coupled to erasure thresholds +a and −a. Both + inputs of the circuits 19 are coupled to an input signal y. The output Y of the summing device 20 provides a ternary erasure information signal. FIG. 4 shows the ternary values −1,0,+1 that the output signal Y can take in case of various continuous values of input signal y. The curve Q gives the error e as a function of y.

In addition to the three control loops mentioned above the error signal e[k] can also effectively be used in a fourth type of control loop for suppressing DC-offsets and low frequency disturbances in the input signal. Such a loop has a broad bandwidth, or stated otherwise it has a large control speed and is thus very sensitive to decision errors. Such a suppression loop may contain a summing device (not shown) interconnected between the sampler 4 and the detector 5. A loop integrator (not shown), whereto the error signal e[k] is input generates a correction signal, which if subtracted from the signal z[k] and thus provides a cleaned z[k] signal for the detector 5.

Whilst the above has been described with reference to essentially preferred embodiments and best possible modes it will be understood that these embodiments are by no means to be construed as limiting examples of the devices concerned, because various modifications, features and combination of features falling within the scope of the appended claims are now within reach of the skilled person. For example an erasure zone which holds for a binary signal will become a double zone if a ternary signal is applied in the transmitter-receiver system concerned. In 8 phase technique there will be 7 erasure zones, while in multipoint technique there will be several zones, whose particular forms will become increasingly complex, but the principle described above for only one erasure zone essentially remains the same.

What is claimed is:

1. A receiver, comprising:
   a variable gain amplifier having an input terminal, an output terminal, and a control terminal;
   an adaptive equalizer having an input terminal, an output terminal, and a control terminal, the adaptive equalizer input terminal coupled to the variable amplifier output terminal;
   a sampler having an input terminal, an output terminal, and a control terminal, the sampler input terminal coupled to the adaptive equalizer output terminal;
   a data detector having an input terminal, an error output terminal, a decision output terminal, and an erasure output terminal, the data detector input terminal coupled to the sampler output terminal;
   a control signal generator coupled to the data detector error output terminal, the data detector decision output terminal, and the data detector erasure output terminal;
   a first integrator coupled to receive signals from the control signal generator, and further coupled to provide signals to the variable gain amplifier;
   a second integrator coupled to receive signals from the control signal generator, and further coupled to provide signals to the adaptive equalizer;
   a loop filter having an input terminal and an output terminal, the loop filter input terminal coupled to receive signals from the control signal generator; and
   a voltage controlled oscillator (VCO) coupled to receive signals from the loop filter and further coupled to provide signals to the sampler;
   wherein the first integrator and the variable gain amplifier form part of a first control loop, the second integrator and the adaptive equalizer form part of a second control loop, the loop filter and the VCO form part of third control loop; and wherein the control signal generator, responsive to a signal received from the data detector erasure output terminal, maintains the control signals to the first, second, and third control loops, in a constant state.

2. The receiver of claim 1, wherein the data detector comprises a dual decision feedback equalizer comprising two slicers having thresholds being anti-symmetrical relative to a median threshold value.

* * * * *

Disclaimer

6,788,749—Johannes Otto Voorman, Eindhoven, (NL); Johannes Wilhelmus Maria Bergmans, Eindhoven, (NL); Ho Wai Wong-Lam, Sunnyvale, CA (US). ERASURE BASED INSTANTANEOUS LOOP CONTROL IN A DATA RECEIVER. Patent dated September 7, 2004. Disclaimer filed March 28, 2008, by the assignee, Koninklijke Philips Electronics N.V.

Hereby enters this disclaimer to all claims of said patent.

(*Official Gazette October 7, 2008*)